(12) United States Patent
Choo et al.

(10) Patent No.: US 9,813,272 B2
(45) Date of Patent: *Nov. 7, 2017

(54) OFDM TRANSMITTING AND RECEIVING SYSTEMS AND METHODS THEREOF

(71) Applicant: SAMSUNG ELECTRONICS CO., LTD., Suwon-si (KR)

(72) Inventors: Kyo-shin Choo, Yongin-si (KR); June-hee Lee, Seongnam-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/397,280

(22) Filed: Jan. 3, 2017

(65) Prior Publication Data

US 2017/0118057 A1 Apr. 27, 2017

Related U.S. Application Data

(63) Continuation of application No. 14/337,969, filed on Jul. 22, 2014, now Pat. No. 9,584,352, which is a (Continued)

(30) Foreign Application Priority Data

Feb. 16, 2007 (KR) .................. 10-2007-0016824

(51) Int. Cl.
*H04L 27/26* (2006.01)

(52) U.S. Cl.
CPC ...... *H04L 27/2618* (2013.01); *H04L 27/2628* (2013.01); *H04L 27/2647* (2013.01)

(58) Field of Classification Search
CPC ............. H04L 27/2618; H04L 27/2614; H04L 27/262; H04L 27/2623; H04L 27/2624;
(Continued)

(56) References Cited

U.S. PATENT DOCUMENTS 6,125,103 A * 9/2000 Bauml ................ H04L 27/2602
370/203
6,314,146 B1 11/2001 Tellado et al.
(Continued)

FOREIGN PATENT DOCUMENTS

WO 2005/076560 A1 8/2005

OTHER PUBLICATIONS

Communication dated Sep. 11, 2012, issued by the European Patent Office in counterpart European Patent Application No. 08712436.8.
(Continued)

*Primary Examiner* — Siu Lee
(74) *Attorney, Agent, or Firm* — Sughrue Mion, PLLC

(57) ABSTRACT

An orthogonal frequency division multiplexing (OFDM) transmission system is provided which includes a data processing unit which generates a transmission signal using a plurality of tones including a reserved tone, a storage unit which stores Peak Reduction Kernel information according to the type of data symbol, and a compensation unit which retrieves the Peak Reduction Kernel information according to the type of data symbol from the storage unit and causes the retrieved information to be carried by the reserved tone included in the transmission signal. Therefore, a Peak-to-Average Power Ratio (PAPR) can be efficiently compensated.

10 Claims, 6 Drawing Sheets

Related U.S. Application Data continuation of application No. 12/527,202, filed as application No. PCT/KR2008/000788 on Feb. 11, 2008, now Pat. No. 8,804,477.

(58) Field of Classification Search
CPC ............ H04L 27/2626; H04L 27/2643; H04L 27/2647; H04L 27/2649; H04L 27/2653; H04L 27/2675; H04L 27/2628
USPC ........ 375/259, 260, 285, 295, 296, 297, 316, 375/340, 342, 346
See application file for complete search history.

(56) References Cited

U.S. PATENT DOCUMENTS

| | | |
|---|---|---|
| 6,424,681 B1 | 7/2002 | Tellado |
| 6,654,431 B1 * | 11/2003 | Barton .................... H04L 5/023 375/346 |
| 6,757,299 B1 | 6/2004 | Verma et al. |
| 6,853,632 B1 | 2/2005 | Verma et al. |
| 6,925,128 B2 | 8/2005 | Corral |
| 6,928,084 B2 | 8/2005 | Cimini, Jr. |
| 6,985,533 B2 | 1/2006 | Attallah et al. |
| 7,349,817 B2 | 3/2008 | Cha |
| 7,376,202 B2 | 5/2008 | Bar-Ness et al. |
| 7,418,041 B2 | 8/2008 | Jung et al. |
| 7,519,123 B1 * | 4/2009 | Larsson ............. H04B 1/71635 370/209 |
| 7,535,950 B2 | 5/2009 | Chen et al. |
| 7,627,046 B1 | 12/2009 | Dick et al. |
| 7,746,766 B2 | 6/2010 | Kowalski et al. |
| 7,769,093 B2 | 8/2010 | Zhou |
| 7,795,602 B2 | 9/2010 | Leonard et al. |
| 7,907,588 B2 | 3/2011 | Schaepperle et al. |
| 8,040,787 B2 | 10/2011 | Bar-Ness |
| 8,045,447 B2 | 10/2011 | Bitran et al. |
| 8,045,627 B2 | 10/2011 | Clausen et al. |
| 8,331,466 B2 | 12/2012 | Guo et al. |
| RE44,105 E | 3/2013 | Khan |
| 8,416,675 B2 | 4/2013 | Yang |
| 8,498,196 B2 | 7/2013 | Garcia et al. |
| 8,804,477 B2 * | 8/2014 | Choo ................. H04L 27/2618 370/203 |
| 9,584,352 B2 * | 2/2017 | Choo ................. H04L 27/2618 |
| 2001/0022777 A1 | 9/2001 | Bourget et al. |
| 2001/0034151 A1 | 10/2001 | Carr |
| 2003/0063556 A1 | 4/2003 | Hernandez |
| 2003/0086363 A1 | 5/2003 | Hernandez |
| 2004/0100210 A1 | 5/2004 | Hori et al. |
| 2004/0141485 A1 | 7/2004 | Yoshino et al. |
| 2004/0179468 A1 | 9/2004 | Jaenecke et al. |
| 2005/0008094 A1 | 1/2005 | Kramer et al. |
| 2005/0089109 A1 * | 4/2005 | Yun .................... H04L 27/2618 375/260 |
| 2005/0249110 A1 | 11/2005 | Huo et al. |
| 2006/0140296 A1 | 6/2006 | Cleveland et al. |
| 2006/0268672 A1 | 11/2006 | Sari |
| 2007/0098094 A1 | 5/2007 | Yue et al. |
| 2007/0121483 A1 | 5/2007 | Zhang et al. |
| 2007/0121736 A1 | 5/2007 | Clausen et al. |
| 2007/0140101 A1 | 6/2007 | Guo et al. |
| 2007/0217329 A1 | 9/2007 | Abedi |
| 2007/0242598 A1 | 10/2007 | Kowalski |
| 2008/0159422 A1 | 7/2008 | Chen et al. |
| 2008/0181333 A1 | 7/2008 | Jiang |
| 2009/0304097 A1 | 12/2009 | Han et al. |
| 2009/0310658 A1 | 12/2009 | Garg |
| 2009/0310659 A1 | 12/2009 | Garg |
| 2010/0002802 A1 | 1/2010 | Choo |
| 2010/0008442 A1 | 1/2010 | Hellberg |
| 2010/0195484 A1 | 8/2010 | Laroia et al. |
| 2011/0317783 A1 | 12/2011 | Garcia et al. |

OTHER PUBLICATIONS

Communication dated Sep. 4, 2012, issued by the European Patent Office in counterpart European Patent Application No. 08712436.8.
Communication dated Aug. 26, 2014 issued by the European Patent Office in counterpart European Application No. 13195206.1.
Communication dated Jul. 16, 2015, issued by the European Patent Office in counterpart European Application No. 13195206.1.
Yoo, S. et al., "A Novel PAPR Reduction Scheme for OFDM Systems: Selective Mapping of Partial Tones (SMOPT)", IEEE Transactions on Consumer Electronics, Feb. 2006, pp. 40-43, vol. 52, No. 1.
Non-Final Office Action mailed Jun. 29, 2015 in U.S. Appl. No. 14/337,969.
Final Office Action mailed Nov. 27, 2015 in U.S. Appl. No. 14/337,969.
Non-Final Office Action mailed Apr. 28, 2016 in U.S. Appl. No. 14/337,969.
Notice of Allowance mailed Oct. 3, 2016 in U.S. Appl. No. 14/337,969.
Communication issued Feb. 14, 2017, issued by the European Patent Office in counterpart European Patent Application No. 16200113.5.

* cited by examiner

OFDM TRANSMITTING AND RECEIVING SYSTEMS AND METHODS THEREOF

CROSS-REFERENCE TO RELATED APPLICATIONS

This is a continuation of U.S. patent application Ser. No. 14/337,969, filed Jul. 22, 2014, which is a continuation of U.S. patent application Ser. No. 12/527,202, filed Aug. 14, 2009, now U.S. Pat. No. 8,804,477, which is a National Stage of International Application No. PCT/KR2008/000788, filed Feb. 11, 2008, and claims priority from Korean Patent Application No. 10-2007-0016824, filed on Feb. 16, 2007, in the Korean Intellectual Property Office, the disclosures of which are incorporated herein in their entireties by reference.

FIELD OF THE INVENTION

Systems and methods consistent with the present invention relate to orthogonal frequency division multiplexing (OFDM) transmitting and receiving. More particularly, the present invention relates to OFDM transmitting and receiving systems which select a Peak Reduction Kernel corresponding to the type of data symbol and apply the selected Peak Reduction Kernel in order to compensate a Peak-to-Average Power ratio (PAPR), and to methods thereof.

BACKGROUND OF THE INVENTION

OFDM schemes are utilized as standards for IEEE 802.11a, ETSI BRAN'S HYPERLAN 2, European digital audio broadcasting (DAB) and digital TV DVB-T. A conventional single carrier transmission scheme in which information is carried by a single carrier causes interference between symbols to increase, so distortion also increases. Accordingly, an equalizer of a receiver must be complicated. In order to solve these problems of the conventional single carrier transmission scheme, OFDM schemes have been introduced.

OFDM schemes enable data to be transmitted using multi-carriers. Such OFDM schemes are able to convert data symbols input in series into parallel data symbols, to modulate each of the parallel symbols into a plurality of tone signals which are orthogonal to each other, and to transmit the modulated signals.

OFDM schemes have been widely applied to digital transmission technologies, such as digital audio broadcasting (DAB), digital television, wireless local area network (WLAN) or wireless asynchronous transfer mode (WATM). In particular, OFDM schemes maintain orthogonality between tone signals, unlike conventional multicarrier schemes, so it is possible to obtain optimum transmission efficiency during high speed data transmission. Additionally, almost the whole available frequency band can be utilized and multi-path fading can be reduced.

However, OFDM schemes have the disadvantage that OFDM signals exhibit a high Peak-to-Average Power Ratio (PAPR) due to modulation between multi-carriers. The PAPR is essentially identical to a Peak-to-Average Ratio (PAR). Since data is transmitted using multi-carriers in OFDM schemes, the final OFDM signal has an amplitude equal to the sum of amplitudes of individual carriers so that variation in the amplitude increases. Additionally, if phases of the individual carriers are identical, a very large value may be obtained. Accordingly, the signal is out of the linear operating range of a high power linear amplifier, so distortion may occur during a linear amplifying operation.

Therefore, methods for reducing such a PAPR have been studied. Among the methods, a tone reservation method has been provided, in which a Peak Reduction Kernel is carried and transmitted by a reserved tone, which is not used to transmit data, among a plurality of tones for generating multi carrier signals, so as to compensate a PAPR.

In more detail, some of the tones are reserved in a frequency domain. After an initial value (for example, 0) is temporarily carried by the reserved tones, the reserved tones are converted into time-domain signals, and a signal corresponding to a position having power greater than the permissible peak power is searched. A Peak Reduction Kernel for compensating the position is then carried by the reserved tones, so that the PAPR can be compensated.

However, some of the reserved tones may be used for other purposes, for example pilot transmission. Additionally, the position of reserved tones used for other purposes may change according to a predetermined pattern.

The Peak Reduction Kernels has to be carried by reserved tones other than the reserved tones used for other purposes (hereinafter, referred to as additional data tones), so it is difficult to detect an optimum Peak Reduction Kernel. Additionally, the position of reserved tones into which Peak Reduction Kernels are to be inserted changes in various ways according to the type of symbols, and accordingly it is not easy to determine a Peak Reduction Kernel according to the above change.

Therefore, there is a limitation to form a Peak Reduction Kernel, and the PAPR reduction efficiency may thus be reduced.

SUMMARY

An exemplary embodiment of the present invention provides orthogonal frequency division multiplexing (OFDM) transmitting and receiving systems which select a Peak Reduction Kernel for Peak-to-Average Power ratio (PAPR) compensation according to the type of data symbols and apply the selected Peak Reduction Kernel so that a PAPR may be effectively compensated even when the position of reserved tones used for other purposes changes, and methods thereof.

An exemplary embodiment of the present invention also provides orthogonal frequency division multiplexing (OFDM) transmitting and receiving systems which detect the position of reserved tones without transmitting additional data so that the data symbols may be effectively recovered, and methods thereof.

According to an aspect of the present invention, there is provided an orthogonal frequency division multiplexing (OFDM) transmitting system including a data processing unit which generates a transmission signal using a plurality of tones including reserved tones; a storage unit which stores Peak Reduction Kernel information according to the type of data symbols; and a compensation unit which retrieves from the storage unit information on a Peak Reduction Kernel matching the type of data symbol to be transmitted and causes the retrieved information to be carried by the reserved tones contained in the transmission signal.

The data processing unit may set a position of an additional data tone, into which additional information is to be inserted and carried, according to a preset sequence, and may cause the type of data symbol to be changed.

If there are a plurality of Peak Reduction Kernels corresponding to the type of data symbols, the compensation unit may select one from among the plurality of Peak Reduction Kernels and may cause the selected Peak Reduction Kernel to be carried by the reserved tones contained in the transmission signal.

The data processing unit may include a data splitter which converts the data symbols into a plurality of tone signals; an Inverse Fast Fourier Transform (IFFT) processing unit which performs IFFT processing on the plurality of tone signals generated by the data splitter; and a parallel-to-serial converting unit which converts the plurality of tone signals processed by the IFFT processing unit into a single serial signal.

The data splitter may cause additional information to be carried by some of the reserved tones, excluding a normal tone which carries the data symbol from the plurality of tones, to generate an additional data tone signal, and may set a position of the additional data tone signal according to the type of data symbols in the preset sequence so as to change the type of data symbol.

According to an aspect of the present invention, there is provided an orthogonal frequency division multiplexing (OFDM) receiving system including a storage unit which stores position information of reserved tones, into which Peak Reduction Kernel information is inserted, according to the type of data symbols; and a reception data processing unit which, if a transmission signal is received from an OFDM transmitting system, checks a position of a reserved tone matching the type of data symbol represented by the received transmission signal, and recovers the data symbol.

The reception data processing unit may check the type of data symbol according to the same sequence as used in the OFDM transmitting system, may retrieve position information of a reserved tone matching the checked type from the storage unit, and may recover the data symbol.

According to an aspect of the present invention, there is provided an orthogonal frequency division multiplexing (OFDM) transmitting method including generating a transmission signal using a plurality of tones including reserved tones; retrieving information on a Peak Reduction Kernel matching the type of data symbol to be transmitted, from a storage unit which stores Peak Reduction Kernel information according to the type of data symbols; and causing the retrieved information to be carried by the reserved tones contained in the transmission signal and transmitting the reserved tones with the retrieved information.

The generating may include setting a position of an additional data tone, into which additional information is to be inserted and carried, according to a preset sequence, and causing the type of data symbol to be changed.

The retrieving may include, if there are a plurality of Peak Reduction Kernels corresponding to the type of data symbols, selecting one from among the plurality of Peak Reduction Kernels according to the preset sequence.

The generating may include converting the data symbols into a plurality of tone signals; performing inverse fast Fourier transform (TFFT) processing on the plurality of converted tone signals; and converting the plurality of transformed tone signals into a single serial signal.

The converting the data symbols may include setting a position of an additional data tone which is to carry additional information among tones excluding a normal tone which carries the data symbol from the plurality of tones, according to the type of data symbols in the preset sequence so as to change the type of data symbol.

According to an aspect of the present invention, there is provided an orthogonal frequency division multiplexing (OFDM) receiving method including receiving a transmission signal from an OFDM transmitting system; detecting a position of a reserved tone matching the type of data symbol represented by the received transmission signal from a storage unit which stores position information of reserved tones, into which Peak Reduction Kernel information is inserted, according to the type of data symbols; and recovering a data symbol carried by a normal tone according to the detected position of the reserved tone.

The detecting may include checking the type of data symbol according to the same sequence as used in the OFDM transmitting system; and retrieving position information of a reserved tone matching the checked type from the storage unit.

BRIEF DESCRIPTION OF THE DRAWINGS

These and/or other aspects of the invention will become and more readily appreciated from the following description of the exemplary embodiments, taken in conjunction with the accompanying drawings of which.

DETAILED DESCRIPTION OF EXEMPLARY EMBODIMENTS OF THE INVENTION

Figure 1:
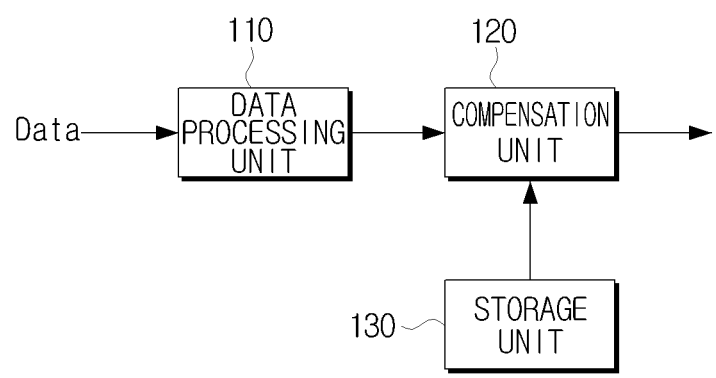
FIG. 1 is a block diagram of an orthogonal frequency division multiplexing (OFDM) transmitting system according to an exemplary embodiment of the present invention.

Reference will now be made in detail to the present exemplary embodiments of the present invention, examples of which are illustrated in the accompanying drawings, wherein like reference numerals refer to the like elements throughout. The exemplary embodiments are described below in order to explain the present invention by referring to the figures.

FIG. 1 is a block diagram of an orthogonal frequency division multiplexing (OFDM) transmitting system according to an exemplary embodiment of the present invention. The OFDM transmitting system of FIG. 1 includes a data processing unit 110, a compensation unit 120 and a storage unit 130.

The data processing unit 110 generates a transmission signal using a plurality of tones including a reserved tone. Specifically, the data processing unit 110 modulates data symbols that are to be transmitted, generates a plurality of tone signals, and then converts the plurality of tone signals into time-domain signals, so as to generate a transmission signal.

The reserved tone refers to a tone reserved to carry Peak Reduction Kernel information or other additional information, as described above. Hereinafter, a reserved tone to carry additional information is referred to as an additional data tone.

Reserved tones may be disposed either randomly or in a predetermined sequence, such as every third or fourth tone. For example, if (8 0 1024) tones exist, 4, 8, 12, 16, 20, 24, ..., 4n-th tones are used as reserved tones.

Additionally, reserved tones disposed in regular positions among all the reserved tones may be used to transmit additional information. The position of reserved tones to transmit additional information, namely, the position of additional data tones may be determined according to the type of data symbols.

Additional information, such as pilot information, is inserted into each symbol, and transmitted. Pilot information refers to information to check the signal quality and determine whether to perform channel compensation, and may be shared with a receiver (not shown). Such pilot information is inserted into each respective data symbol and transmitted, in order to equalize the power for transmitting data symbols. Additionally, in order to prevent errors that occur when a tone signal into which pilot information is inserted to be carried among a plurality of tone signals is lost, causing the tone signal not to be transmitted to a receiver, the position of a tone into which pilot information is inserted to be carried is changed according to the type of symbols. Furthermore, system information to notify a coding rate or modulation method is also inserted into each symbol and transmitted, in the same manner as additional information described above.

The compensation unit 120 may insert Peak Reduction Kernels into reserved tones obtained by excluding additional data tones and normal tones from all the tones. As described above, the position of available reserved tones may be determined according to the type of data symbols. Accordingly, the compensation unit 120 retrieves information on a Peak Reduction Kernel from the storage unit 130, as the most suitable for a current data symbol, and uses the retrieved information.

The storage unit 130 stores information on Peak Reduction Kernels according to the type of data symbols. The information stored in the storage unit 130 includes information contained in both the OFDM transmitting system and an OFDM receiving system (not shown).

A system designer determines a Peak Reduction Kernel corresponding to a reserved tone in a specific position. If 4, 8, 12, 16, 20, 24, 28, 32, ..., 4n-th tones are used as reserved tones, and if the 4, 12, 20, 28-th tones among the tones are used to transmit additional information, information regarding Peak Reduction Kernels when the 8, 16, 24, 32, ..., 8n-th tones are used, is searched and stored in the storage unit 130.

As shown in FIG. 1, the compensation unit 120 checks a current data symbol and directly retrieves information on a Peak Reduction Kernel corresponding to the current data symbol from the storage unit 130. However, this operation of the compensation unit 120 may be performed by an additional control unit (not shown), and the compensation unit 120 may perform only functions of compensating a Peak-to-Average Power Ratio (PAPR) using the provided Peak Reduction Kernel.

FIGS. 2 to 5 are graphs illustrating a process by which the compensation unit 120 compensates a PAPR using a Peak Reduction Kernel, according to an exemplary embodiment of the present invention.

Figure 2:
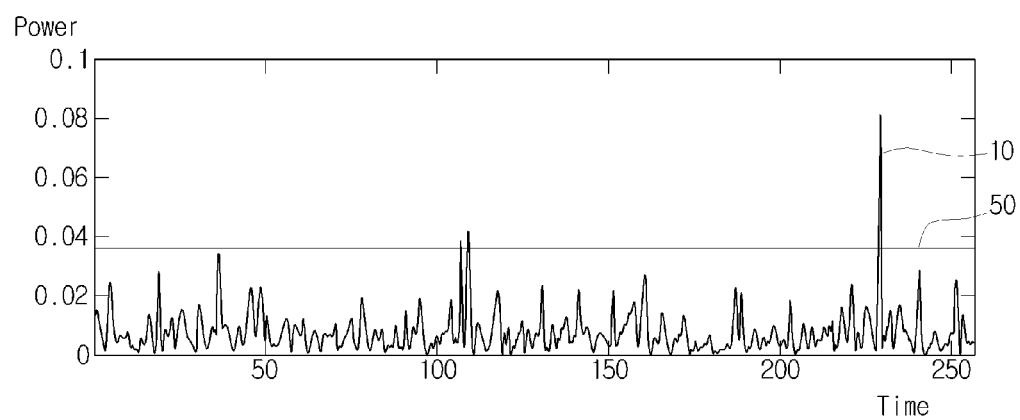
FIGS. 2 to 5 are graphs illustrating a process for compensating a Peak-to-Average Power Ratio (PAPR) using a Peak Reduction Kernel, according to an exemplary embodiment of the present invention.

FIG. 2 is a graph illustrating a change in power of the time-domain signals converted by the data processing unit 110. In FIG. 2, the transmission signal may have peaks of various sizes. In this situation, a peak of the transmission signal may significantly increase in a certain position in which signals having the same phase among other tone signals are synthesized. In FIG. 2, a peak 10 exceeds a threshold level 50.

Figure 3:
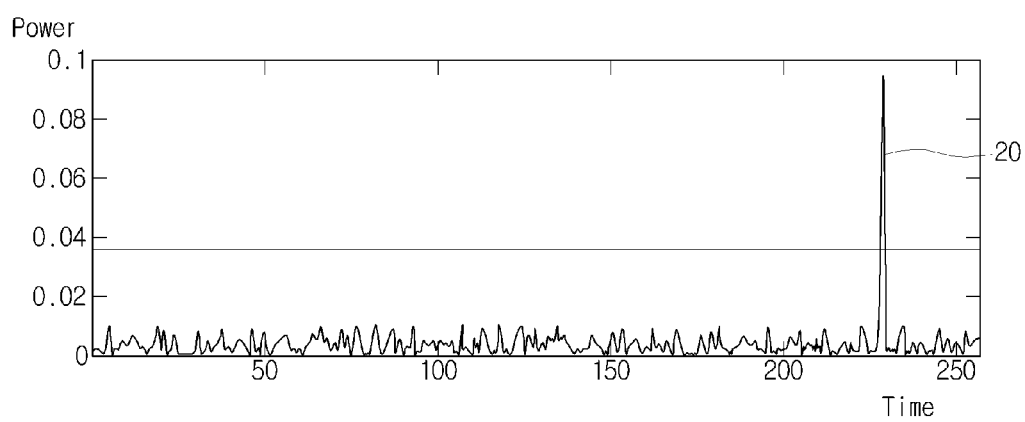

As shown in FIG. 3, the compensation unit 120 retrieves a Peak Reduction Kernel from the storage unit 130 in order to compensate distortion. The Peak Reduction Kernel is in the form of a signal having a compensation peak 20, which coincides with the peak 10, and occurs in the position in which the peak 10 occurs. The compensation unit 120 inserts data, into which symbols of the compensation peak 20 are converted, into each of the reserved tones. Accordingly, the compensation peak 20 carried by the reserved tone and the peak 10 carried by the normal tone are offset to each other, so that the distortion can be compensated.

The system designer may generate compensation signals according to the gradient algorithm, and store the generated compensation signals in the storage unit 130 in advance. An initial value (for example, 0) is carried by reserved tones currently available in the current data symbol, so that the distortion is analyzed. Additionally, it is possible to re-analyze a change in the distortion while controlling data that will be carried by the reserved tones. Therefore, it is possible to generate a Peak Reduction Kernel most suitable for the current reserved tone.

Figure 4:
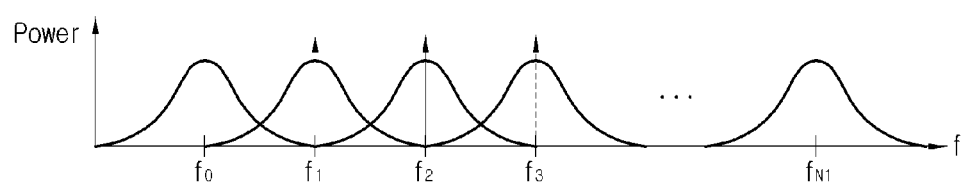
Figure 5:
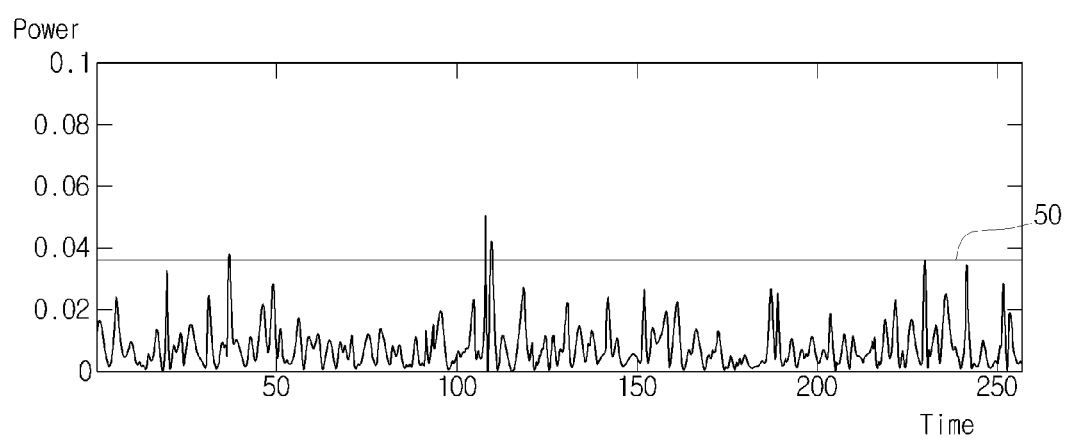

FIG. 4 is a graph showing a form of a transmission signal in a frequency domain. In FIG. 4, a tone having a center frequency f2 carries general data, and tones having center frequencies f1 and f3 carry Peak Reduction Kernels. FIG. 5 is a graph showing a PAPR compensated by the Peak Reduction Kernel of FIG. 3. In FIG. 5, the peak 10 is reduced to less than the threshold level 50.

Figure 6:
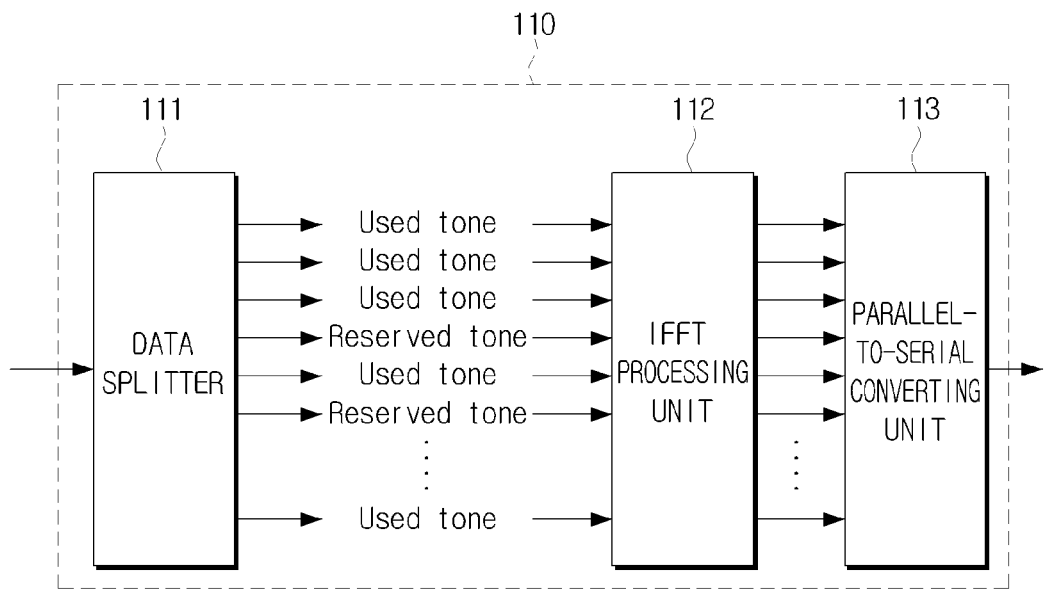
FIG. 6 is a block diagram of a data processing unit included in the OFDM transmitting system of FIG. 1.

FIG. 6 illustrates the data processing unit 110 applicable to the OFDM transmitting system of FIG. 1. The data processing unit 110 of FIG. 6 includes a data splitter 111, an Inverse Fast Fourier Transform (IFFT) processing unit 112 and a parallel-to-serial converting unit 113.

The data splitter 111 causes data to be carried by a plurality of tones, converts the plurality of tones containing the data into a plurality of tone signals, and outputs the converted plurality of tone signals. Specifically, the data splitter 111 codes the data using a preset coding method, and performs symbol mapping on the coded data, so that modulation symbols are generated. The data splitter 111 then converts the generated modulation symbols into a plurality of parallel symbols, to generate a plurality of tone signals. To achieve this, the data splitter 111 may include an encoder (not shown), a symbol mapper (not shown), a serial-to-parallel converter (not shown) or a pilot symbol inserter (not shown).

The IFFT processing unit 112 performs IFFT processing on the plurality of tone signals generated by the data splitter 111, so that signals in the frequency domain are converted into transmission signals in the time domain.

The parallel-to-serial converting unit 113 converts the plurality of tone signals processed by the IFFT processing unit 112 into a single serial signal.

The data splitter 111 reserves some of the plurality of tones. The reserved tones do not carry general data. Additionally, some of the reserved tones carry additional information such as pilot information according to a preset sequence, so the reserved tones are used as additional data tones. In this situation, the position of the additional data tones may be determined according to the preset sequence. Accordingly, the type of data symbols may change.

For example, if the reserved tones include every third tone, 3, 6, 9, 12, 15, 18, 21, 24, 27, 30, 33, 36, . . . , 3n-th tones among the plurality of tones are used as reserved tones. In this situation, there are three types of data symbol. The first type is used when the (3n−2)-th reserved tones are used as additional data tones; the second type is used when the (3n−1)-th reserved tones are used as additional data tones; and the third type is used when the 3n-th reserved tones are used as additional data tones. Here, n is an integer. Optimum Peak Reduction Kernels are generated according to each type and stored in the storage unit 130, as described above.

The data splitter 111 may change the type of data symbols according to the preset sequence. The sequence may be, for example, a sequence of 1→2→3→1→2→3, a sequence of 1→3→2→1→3→2 or a sequence of 1→2→3→2→1→2→3→2.

The configuration and operation of the data processing unit 110 are known to those skilled in the art, so detailed description is omitted.

A process by which the compensation unit 120 retrieves data stored in the storage unit 130 according to the type of data symbols will now be described with the following equations.

If a set of additional data tones is P and if the type of additional data tones is K, P is represented by the following Equation 1.

$$Pi = \{Pi,1, Pi,2, Pi,3, Pi,4, Pi,5, \ldots Pi, im\} \text{ where } i=\{1, 2, \ldots K\}$$ [Equation 1]

In Equation 1, Pi indicates a set of i-th tones; Pi,j indicates a position of the j-th component among the set of i-th tones; and im indicates the total number of components in the set of i-th tones.

The storage unit 130 may store M Peak Reduction Kernels represented by the following Equation 2.

$$PRKi = \{PRKi,1, PRKi,2, PRKi,3, \ldots PRKi, in\} \text{ where } i=\{1,2,3, \ldots M\}$$ [Equation 2]

In Equation 2, PRKi indicates an i-th Peak Reduction Kernel; and PRKi,j indicates a position of the j-th component of the i-th Peak Reduction Kernel, that is, a compensation signal to be inserted into the j-th reserved tone. Additionally, in indicates the total number of components in the i-th Peak Reduction Kernel.

The compensation unit 120 may select a Peak Reduction Kernel according to the following condition.

$$PRK_y \text{ where } \forall PRK_{y,j} \notin P_i$$ [Equation 3]

Accordingly, the compensation unit 120 may select a Peak Reduction Kernel of which none of the components overlap with the position of each of the set P of additional data tones. In this situation, if there are a plurality of Peak Reduction Kernels of which none of the components overlap with the position of each of the set P, that is, if there are a plurality of Peak Reduction Kernels corresponding to the type of data symbols, the compensation unit 120 may optionally select one from among the plurality of Peak Reduction Kernels. In this situation, the selection order is also known in the OFDM receiving system.

Figure 7:
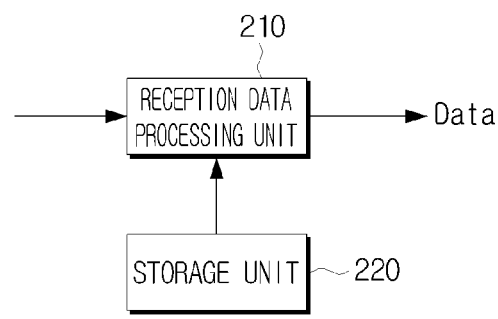
FIG. 7 is a block diagram of an OFDM receiving system according to an exemplary embodiment of the present invention.

FIG. 7 is a block diagram of an OFDM receiving system according to an exemplary embodiment of the present invention. The OFDM receiving system of FIG. 7 may receive a reception signal from the OFDM transmitting system of FIG. 1 and process the reception signal.

In FIG. 7, the OFDM receiving system includes a reception data processing unit 210 and a storage unit 220.

The reception data processing unit 210 receives the transmission signal from the OFDM transmitting system and recovers the data symbol.

The storage unit 220 stores position information of reserved tones according to the type of data symbols. The position information of reserved tones provides notification on the position of reserved tones into which Peak Reduction Kernel information is inserted.

If the transmission signal is received, the reception data processing unit 210 reads position information of a reserved tone matching a data symbol represented by the received transmission signal from the storage unit 220, and recovers the data symbol from the normal tone.

Specifically, the reception data processing unit 210 may check the type of data symbol according to the sequence used by both the OFDM transmitting system and OFDM receiving system. For example, if the type of data symbol is set to change according to the sequence of 1→2→3→1→2→3, the reception data processing unit 210 sequentially retrieves a plurality of pieces of position information of reserved tones matching each type from the storage unit 220. Accordingly, the reception data processing unit 210 may check tones other than the reserved tones, and recover the data symbol.

Figure 8:
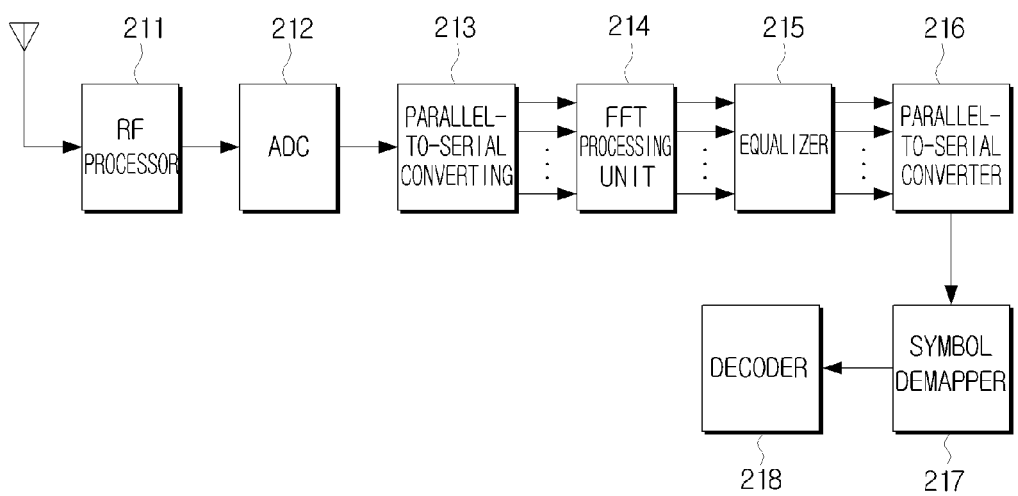
FIG. 8 is a block diagram of a reception data processing unit included in the OFDM receiving system of FIG. 7.

FIG. 8 is a block diagram of the reception data processing unit 210 applicable to the OFDM receiving system of FIG. 7. The reception data processing unit 210 of FIG. 8 may include a radio frequency (RF) processor 211, an analog-to-digital converter (ADC) 212, a serial-to-parallel converter 213, a Fast Fourier Transform (FFT) processing unit 214, an equalizer 215, a parallel-to-serial converter 216, a symbol demapper 217 and a decoder 218.

The RF processor 211 down-converts a signal received via a reception antenna to an intermediate frequency (IF) signal. The ADC 212 converts the down-converted signal into a digital signal, and the serial-to-parallel converter 213 converts the digital signal into a plurality of parallel signals.

The FFT processing unit 214 performs FFT processing on the plurality of parallel signals. The equalizer 215 performs channel equalization processing on the signals processed by the FFT processing unit 214. The parallel-to-serial converter 216 receives the parallel signals from the equalizer 215 and converts the received signals into serial signals. The symbol demapper 217 demodulates the converted serial signals by a demodulation method corresponding to the modulation method in the OFDM transmitting system. Subsequently, the decoder 218 decodes the demodulated signals by a decoding method corresponding to the coding method in the OFDM transmitting system, and outputs the decoded signals. The above operations of the reception data processing unit 210 may be performed with respect to tones other than the reserved tones read from the storage unit 220.

Figure 9:
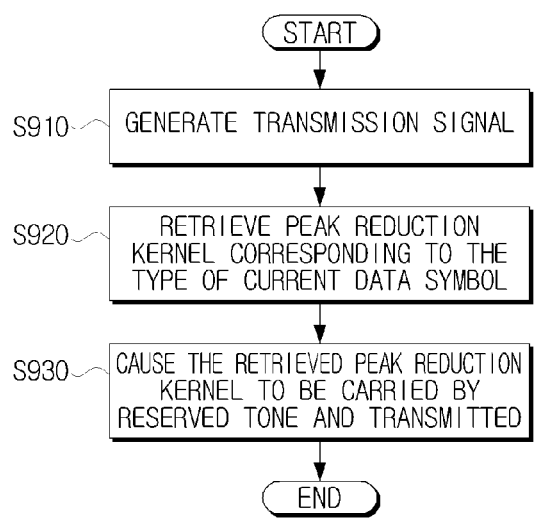
FIG. 9 is a flowchart illustrating an OFDM transmitting method according to an exemplary embodiment of the present invention.

FIG. 9 is a flowchart illustrating an OFDM transmitting method according to an exemplary embodiment of the present invention. In FIG. 9, the OFDM transmitting system modulates the data symbol into a plurality of tones so that a transmission signal is generated (S910). In this situation, the plurality of tones include a plurality of reserved tones, and the position of each of the plurality of reserved tones may change according to the preset sequence, so that the type of data symbols may also change.

After the transmission signal is generated, the OFDM transmitting system checks the type of current data symbol, and then retrieves a Peak Reduction Kernel matching the type of current data symbol (S920). Notification on the type of current data symbol may be given by referring to the preset sequence. Additionally, information regarding the Peak Reduction Kernel may be acquired by retrieval from the storage unit 120 in which Peak Reduction Kernels have already been classified and stored according to the type of data symbols.

Accordingly, the OFDM transmitting system may cause the retrieved Peak Reduction Kernel to be carried by the reserved tone and transmitted (S930). Therefore, the optimum Peak Reduction Kernel may be inserted into the reserved tone even when the position of additional data tones change, so it is possible to effectively reduce the PAPR.

Figure 10:
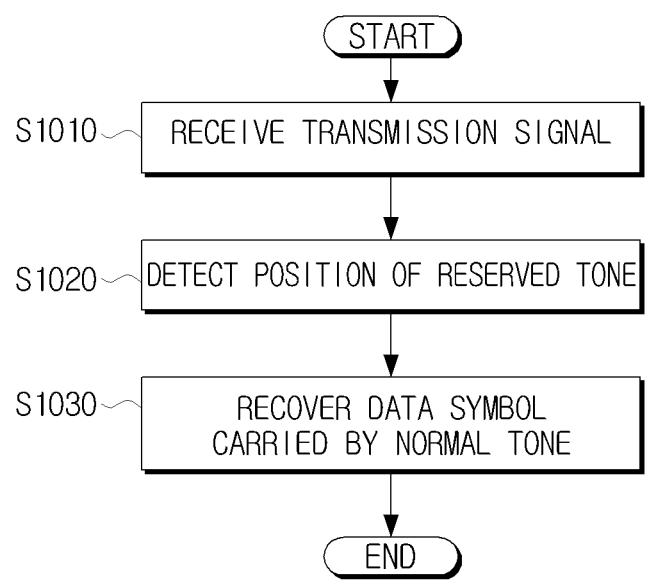
FIG. 10 is a flowchart illustrating an OFDM receiving method according to an exemplary embodiment of the present invention.

FIG. 10 is a flowchart illustrating an OFDM receiving method according to an exemplary embodiment of the present invention. In FIG. 10, if a transmission signal generated by the method of FIG. 9 is received via a reception antenna (S1010), the OFDM receiving system checks the type of data symbol of the received transmission signal according to the preset sequence. Subsequently, the OFDM receiving system retrieves position information of a reserved tone matching the checked type from the storage unit 220, so that the position of the reserved tone is detected (S1020).

The OFDM receiving system then detect the position of tones other than the reserved tone, namely, the position of normal tones or additional data, so that the data symbol may be recovered (S1030). Consequently, it is possible to effectively the data symbol without needing to receive additional information on the position of reserved tones.

As described above, according to the exemplary embodiments of the present invention, a Peak Reduction Kernel for PAPR compensation is previously stored, and the type of current data symbol is checked and the previously stored Peak Reduction Kernel is selected and applied, so it is possible to compensate the PAPR effectively even when the position of reserved tones changes. Additionally, it is possible to reduce the time required to compensate the PAPR. Furthermore, it is possible to effectively recover the data symbol even when additional information providing notification of the position of reserved tones is not received by a receiving system.

The foregoing exemplary embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

The exemplary embodiments of the present invention are applicable to a European digital broadcasting system which receives and transmits broadcasting streams using an OFDM technique.

What is claimed is:

1. An orthogonal frequency division multiplexing (OFDM) transmitting system comprising:
   a storage for storing information related to a position of a reserved tone, the position of the reserved tone varying according to a type of symbol; and
   a processor for identifying the information according to a type of symbol of a data signal, and adding a signal for reducing a Peak-to-Average Power ratio (PAPR) into the data signal based on the information.

2. The OFDM transmitting system of claim 1, wherein the processor is configured to change the type of symbol of the data signal by adjusting a position of an additional data tone according to a predetermined sequence,
   wherein additional information is inserted into the additional data tone.

3. The OFDM transmitting system of claim 1, wherein the processor comprises:
   a data splitter configured to convert the symbol of the data signal into a plurality of tone signals;
   an Inverse Fast Fourier Transform (IFFT) processor configured to perform IFFT on the plurality of tone signals; and
   a parallel-to-serial converter configured to convert the plurality of tone signals processed by the IFFT processor into a single serial signal.

4. An orthogonal frequency division multiplexing (OFDM) receiving system comprising:
   a storage configured to store information regarding a position of reserved tones, the position of the reserved tones varying according to a type of symbol; and
   a reception data processor configured to, in response to receiving a transmission signal from an OFDM transmitting system, identify the information according to the type of symbol in the received transmission signal, and recover the symbol based on the information,
   wherein a signal for reducing a Peak-to-Average Power ratio (PAPR) is inserted into the reserved tones.

5. The OFDM receiving system of claim 4, wherein the reception data processor is configured to identify the type of symbol in the received transmission signal, according to a same sequence as used in the OFDM transmitting system, obtain the information according to the identified type of symbol from the storage, and recover the symbol based on the information.

6. An orthogonal frequency division multiplexing (OFDM) transmitting method comprising:
   identifying information according to a type of symbol of a data signal, from among information related to a position of a reserved tone; and
   adding a signal for reducing a Peak-to-Average Power ratio (PAPR) into the data signal based on the identified information, wherein the position of the reserved tone varies according to a type of symbol.

7. The OFDM transmitting method of claim 6, further comprising
   changing the type of symbol of the data signal by adjusting a position of an additional data tone according to a predetermined sequence,
   wherein additional information is inserted into the additional data tone.

8. The OFDM transmitting method of claim 6, further comprising:
   converting the symbol of the data signal into a plurality of tone signals;
   performing inverse fast Fourier transform (IFFT) on the converted plurality of tone signals; and
   converting the IFFT processed plurality of tone signals into a single serial signal.

9. An orthogonal frequency division multiplexing (OFDM) receiving method comprising:
   receiving a transmission signal from an OFDM transmitting system;
   identifying information according to a type of symbol in the received transmission signal from information regarding a position of reserved tones; and
   recovering the symbol based on the identified information,
   wherein the position of the reserved tones varies according to the type of symbol, and
   wherein a signal for reducing a Peak-to-Average Power ratio (PAPR) is inserted into the reserved tones.

10. The OFDM receiving method of claim 9, wherein the identifying comprises:
- identifying the type of symbol in the received transmission signal, according to a same sequence as used in the OFDM transmitting system;
- obtaining the information according to the identified type of symbol from the storage; and
- recovering the symbol based on the obtained information.

* * * * *